A. J. NESBIT.
BUTT HOOK.
APPLICATION FILED JUNE 12, 1917.
1,278,494.
Patented Sept. 10, 1918.
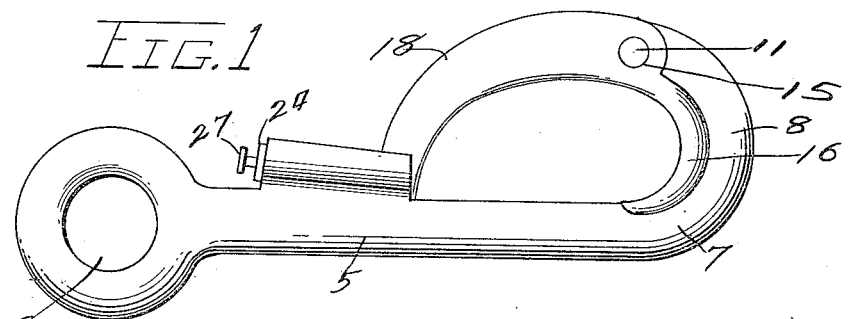
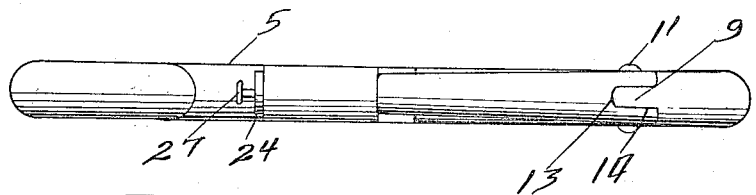
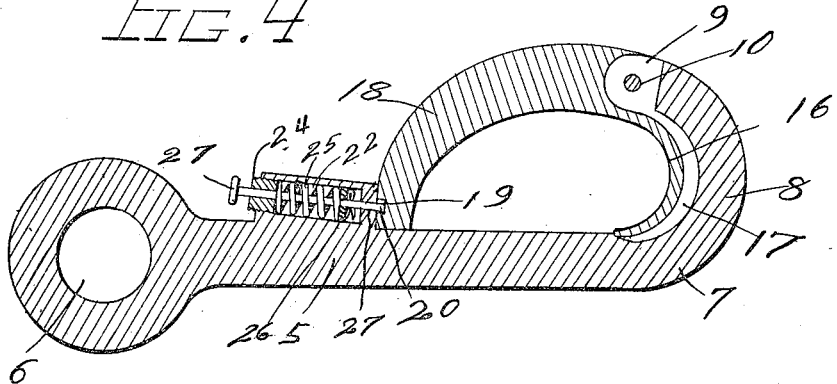
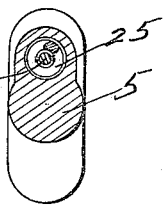
Inventor
A. J. NESBIT

UNITED STATES PATENT OFFICE.

AARON J. NESBIT, OF CARROLLS, WASHINGTON.

BUTT-HOOK.

1,278,494.     Specification of Letters Patent.     Patented Sept. 10, 1918.

Application filed June 12, 1917. Serial No. 174,299.

*To all whom it may concern:*

Be it known that I, AARON J. NESBIT, a citizen of the United States, residing at Carrolls, in the county of Cowlitz, State of Washington, have invented certain new and useful Improvements in Butt-Hooks; and I do hereby declare the following to be a full, clear, and exact description of the invention, such as will enable others skilled in the art to which it appertains to make and use the same.

This invention relates to new and useful improvements in hooks, and pertains more particularly to that class of hooks used in connection with logging chains and similar devices.

The primary object of the invention is to provide a hook which will remain closed during its operation thereby eliminating all possibility of unfastening or loosening of the chain with which the hook is used.

A further object of the invention is to provide a hook by means of which the chain with which it is used is automatically disconnected upon operation of the hook to open same.

Referring to the drawings,

Figure 1 is a side elevation,

Fig. 2 is a top plan view,

Fig. 3 is a sectional view on the line 3—3 of Fig. 1, and;

Fig. 4 is a longitudinal sectional view.

Referring more particularly to the drawings, the device comprises a body portion 5 one end of which is formed with an integral eye 6, the other end of the body portion being bent as at 7 to form a hook 8. The free end of the hook 8 is provided with an extension 9 which is flattened to form bearing faces 10 on its opposite sides, and pivotally connected to said extension 9 by means of a pin or the like 11 is a second hook member 12.

The hook member 12 is notched as at 13 to provide two ears 14 which are adapted to engage the opposite sides of the extension 9, and said ears are perforated as at 15 to receive the bolt 11. The hook 12 is reduced as at 16 and is shaped in such a manner that it conforms in contour to the inner wall of the hook 8, and this portion of the hook 12 is provided with side flanges 17 which are adapted to engage the opposite sides of the hook 8.

The hook 12 is extended rearwardly and downwardly as at 18, and its outer extension is provided with a notch 19 with which is adapted to engage a sliding bolt 20. The body portion is provided with a passage way 22 which terminates in a constricted passage 23 in which the sliding bolt 20 is mounted for operation. This sliding bolt 20 also extends through a screw plug 24 which is threaded into the open end of the passage 22, and mounted between said screw plug 24 and the end of the passage way 22 is a coil spring 25 which surrounds the bolt 20, and said bolt 20 is provided with a washer 26 with which one end of the spring engages. The bolt 20 is also provided with an operating knob or handle 27.

By this construction it will be seen that the spring 25 maintains the end of the bolt 20 in engagement with the notch 19 in the hook 12, thus securing said hook against pivotal movement about the pin 11.

In operation, a link of a logging chain is engaged with the hook portion 17 and the hook member 12 is then rocked about its pivotal point 11 until the notch 19 is engaged by the sliding bolt 20 which retains said link within the hook member 8. In disconnecting the link from the hook member, it is only necessary to disengage the sliding bolt 20 with the notch 19, and by rotating the hook 12 upon its pivot, the chain link will be thrown from the hook and out of engagement therewith.

Having thus described the invention what is claimed is,

A device of the character described comprising a body portion forming a straight shank having an outwardly curved end and an opposite eye end, a barrel formed on the shank adjacent to the eye end, a curved jaw forming a hook bill pivoted to the curved end and adapted to close against the shank, an extension formed on the pivoted end of the jaw and conforming to the shape of the curved end at its inner side to coincide therewith when the jaw is closed, and a spring pressed latch member within the barrel and engageable with the jaw to hold the same closed.

In testimony whereof, I affix my signature in the presence of two witnesses:

AARON J. NESBIT.

Witnesses:
B. L. HUBBELL,
J. A. NESBIT.